(12) United States Patent
Alderson

(10) Patent No.: US 7,187,413 B2
(45) Date of Patent: Mar. 6, 2007

(54) METHOD AND SYSTEM FOR USING AN IMAGE BASED AUTOFOCUS ALGORITHM

(75) Inventor: Timothy Alderson, Winter Spring, FL (US)

(73) Assignee: Lockheed Martin Corporation, Orlando, FL (US)

( * ) Notice: Subject to any disclaimer, the term of this patent is extended or adjusted under 35 U.S.C. 154(b) by 567 days.

(21) Appl. No.: 10/201,951

(22) Filed: Jul. 25, 2002

(65) Prior Publication Data
US 2004/0017502 A1    Jan. 29, 2004

(51) Int. Cl.
G03B 13/36    (2006.01)
H04N 5/232    (2006.01)

(52) U.S. Cl. .................... 348/353; 382/255

(58) Field of Classification Search .......... 348/345, 348/349, 351, 353; 382/254, 255, 266
See application file for complete search history.

(56) References Cited

U.S. PATENT DOCUMENTS 5,512,951 A * 4/1996 Torii ................... 348/353
6,595,916 B2 * 7/2003 Minami et al. .......... 600/167
2002/0080257 A1 * 6/2002 Blank .................. 348/345

* cited by examiner

Primary Examiner—Ngoc-Yen Vu
Assistant Examiner—Adam L. Henderson
(74) Attorney, Agent, or Firm—Birch, Stewart, Kolasch and Birch, LLP

(57) ABSTRACT

An image based autofocus method and system that includes receiving image data; monitoring and analyzing the contrast between different portions of the image data in determining the location of a target wherein the different portions of the image data contain at least one type of image pixel information and the monitoring and analyzing are performed using at least one kernel filter to determine a focus measure; adjusting a focus mechanism that is focusing on the image data; observing an image quality of the image data that has been focused; and continuously outputting an image to support an image processing frame rate and adjusting the focus mechanism to obtain an improved focus image by adjusting the focus mechanism in a positive direction, a negative direction or a zero (0) direction based upon effectuating a desired change in the observed image quality of the image data.

14 Claims, 5 Drawing Sheets

| | |
|---|---|
| Center | Variable |
| Kernel Size | 64X64 |
| # Frames | 15 |
| Noise Lower Threshold | 5 |
| Noise Upper Threshold | 15 |
| Focus Shift | Small |

FIG. 4

METHOD AND SYSTEM FOR USING AN IMAGE BASED AUTOFOCUS ALGORITHM

FIELD OF THE INVENTION

The present invention relates to a method and system for optimizing the focusing of an image using an autofocus algorithm. More particularly, the algorithm is used to optimize the focus of the optics and optical systems relating to targeting systems for missiles that are seeking to acquire and lock onto a prospective target against a surrounding image background.

BACKGROUND OF THE INVENTION

In many targeting and missile guidance systems, optical based seekers are used to acquire, track and engage a prospective target. In the course of using these optical systems, the system is often required to focus on an image that is residing in a set of received imagery thought to contain a target. In accomplishing this objective, imaging systems of the present day are becoming more and more automatic in their ability to focus and lock onto a target.

Many advanced imaging systems have some type of autofocus capability. One autofocus technique is to measure or estimate the range to a target and adjust the focus based on this measured or estimated data. Another technique is to monitor the temperature of the optical system and adjust the focus position and focus related information based on the temperature. Since most optical systems have a focus which shifts or drifts as a function of temperature, this athermalization (i.e., temperature based focusing) allows for normalizing the focus over a range of temperatures encountered in operational scenarios.

All of the aforementioned techniques are based on the user or system requiring the supply of additional information regarding the system and various assumptions that the system is performing as it should in accordance with these various assumptions and design constraints. The conventional techniques use athermalization and range estimation to set the focus of the optics using these "perfect estimates", which are in reality not so perfect. Upon processing and compensating for these estimates, the conventional systems provide the operator with an offset from these perfect estimates to achieve better focus.

These conventional systems have several disadvantages associated with their practical application. One problem is that the factory calibrated athermalization may drift significantly and change over time from the original calibration setpoint that was established in the factory. Another problem is that range estimation for many of these systems is based on flat earth approximations, which do not adequately compensate for the earth's curvature. These range estimation systems also do not compensate well for rough terrain, such as that containing hills, mountains and other topographic barriers. Therefore, these flat earth approximations are not always valid and tend to introduce inaccuracies into the system which in turn adversely impact the accuracy of systems that rely on these techniques.

Therefore, it is desirable to have a method and system which does not suffer from these disadvantages. The present invention solves these problems by deriving a metric of focus based on a scene followed by a shift in focus to obtain optimal performance.

SUMMARY OF THE INVENTION

In accordance with the present invention, the deficiencies in prior systems are overcome by providing a metric of focus based on a scene, followed by a shift in focus to obtain optimal performance.

In one exemplary embodiment, an image based autofocus method includes the steps of: (1) receiving image data and placing the data into a matrix representing a content of the image data; (2) monitoring and analyzing the contrast between different portions of the image data in determining the location of a target wherein said different portions of said image data contain at least one type of image pixel information and wherein said monitoring and analyzing is performed using at least one kernel filter to determine a focus measure; (3) adjusting a focus mechanism that is focusing on said image data; (4) observing an image quality of said image data that has been focused; and (5) continuously outputting an image to support an image processing frame rate and adjusting the focus mechanism to obtain an improved focus image by adjusting said focus mechanism in a positive direction, a negative direction or a zero (0) direction based upon effectuating a desired change in the observed image quality of the image data. In other words, the focus mechanism is changed to make the focus better or worse or to maintain it at a desired level.

In one embodiment of the present invention using a 5×6 image kernel, a focus measure is calculated by the following equation:

$$Fm = Abs(\text{sum}(-G-H-I+V+W+X)) - Abs(\text{sum}(-A-B-C-D-E+Z+1+2+3+4))*(9/25)$$

where:

Fm is a focus measure about a central pixel M; and

Values A–Z and 1–4 represent pixel information within the 5×6 image kernel.

In another exemplary embodiment, an image based autofocus method includes receiving image data; applying one type of filter to a region of data; applying another type of filter to a region of data; using the filtered data from both types of filters to calculate a focus measure.

In another exemplary embodiment, an image based autofocus method includes: receiving image data; applying a 3×3 filter to a region of data; applying a 5×5 filter to a region of data; and using the 3×3 filtered data and the 5×5 filtered data to calculate a focus measure. The method repeats the determination of the focus measure calculation for the neighboring pixels of an individual pixel. The invention calculates a difference in focus measure from pixel to pixel in an observation area to determine a focus measure for that frame of data. In one exemplary embodiment, the observation area can include a 64×64 pixel region. One increases the robustness of the focus measure obtained from a frame of data by using multiple regions of interest (ROI) and the ROI can be selected from a center location of a field of view and the ROI is also selected from a center location of an object being tracked.

A combination of at least three different techniques are used to determine a better focus measure. One technique is using a 1×2 region to determine a focus measure. Another technique is to compare a blurred 3×3 region with a central pixel, wherein the difference of the blurred pixel from the central pixel represents a high frequency contrast change in an image and the image is a high frequency image. Another technique is to compare the high frequency image to its neighboring pixels and the focus measure can be determined from the comparison result by summing the absolute difference of the neighboring pixels. The blurred image has a three times (3×) improvement in noise performance while the central pixel has none.

In another exemplary embodiment of the present invention an autofocus system includes: means for receiving image data and placing said data into a matrix representing a content of said image data; means for monitoring and analyzing the contrast between different portions of said image data in determining the location of a target wherein said different portions of said image data contain at least one type of image pixel information and wherein said monitoring and analyzing is performed using at least one kernel filter to determine a focus measure; means for adjusting a focus mechanism that is focusing on said image data; means for observing an image quality of said image data that has been focused; and means for continuously outputting an image to support an image processing frame rate and adjusting said focus mechanism to obtain an improved focus image by adjusting said focus mechanism in a positive direction, a negative direction or a zero (0) direction based upon effectuating a desired change in said observed image quality of said image data.

BRIEF DESCRIPTION OF THE DRAWINGS

A more complete understanding of the present invention will become apparent from the following description taken in conjunction with the accompanying drawings, wherein:

FIG. 2 is a schematic illustration of a 5×6 kernel;

FIG. 2A is a schematic illustration of a 3×3 kernel;

FIG. 2B is a schematic illustration of a 5×5 kernel;

FIG. 4 is a schematic illustration of exemplary variables that can be input into the algorithm.

DETAILED DESCRIPTION OF THE PREFERRED EMBODIMENTS

Aspects of the invention are disclosed in the accompanying description. Alternate embodiments may be devised without departing from the spirit or the scope of the present invention.

An image based autofocus method utilizes the concept of keeping a sensor or device that is receiving image data in focus based upon scene information residing in an acquired image set of data.

Figure 1:
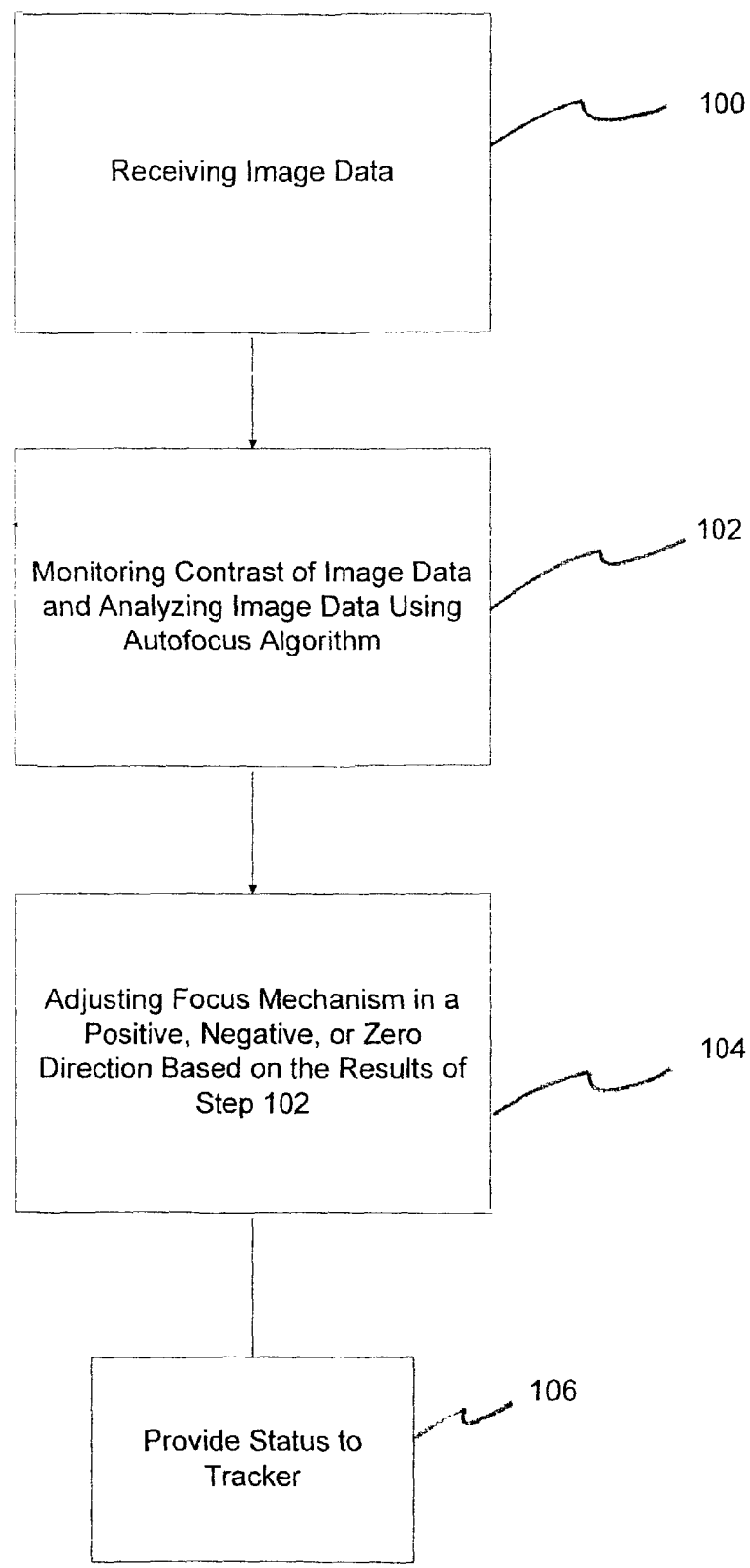
FIG. 1 is a block diagram of one exemplary embodiment of the present invention.

FIG. 1 illustrates a block diagram representation of an exemplary method implementing the present invention. In step 100, image data is received by a sensor or some other type of receiving device (such as an optical seeker head on a guided missile).

In step 102, the contrast existing among the received image data is monitored and analyzed. One way of monitoring the contrast among the image data is to perform the monitoring and analyzing operation of image data at the pixel level and contrast and compare the different pixels with each other in an image kernel(s). One exemplary way of accomplishing this process is to use the autofocus algorithm that will be discussed later.

In step 104, a focus adjusting mechanism is used to adjust the focus by small amounts in a plurality of directions. The focus adjusting mechanism can be adjusted in a positive, negative or zero (0) direction. A zero direction adjustment means that the focus adjusting mechanism is not adjusted at all and left at its current setting.

For example, one way of adjusting the focus would be to move a set of optical elements in a forward or backward direction along an optical axis in order to effectuate a focus change. An image is output continuously as the autofocus algorithm runs, with no interruption to the image processing frame rate. The output 106 provides status (e.g., to a tracker system) and supports an image processing frame rate for a given system configuration.

In step 102, the image quality is observed to determine if the image quality is getting better or worse. The image quality determination is performed by using the autofocus algorithm that will be discussed later. The next set of received image data is then received in step 100 and the focus adjusting mechanism is then adjusted in another direction based upon monitoring the contrast of the image data and analyzing the image data. The present invention will continuously adjust the focus on the image data to achieve and output incremental improvements (e.g., to the least significant bit level of the image data pixels) in the focused image data. If no incremental improvement is possible under a given set of parameters, a zero (0) direction change is made to the focus adjustment mechanism, in order to maintain that level of focus.

Figures 2, 2A, 2B:
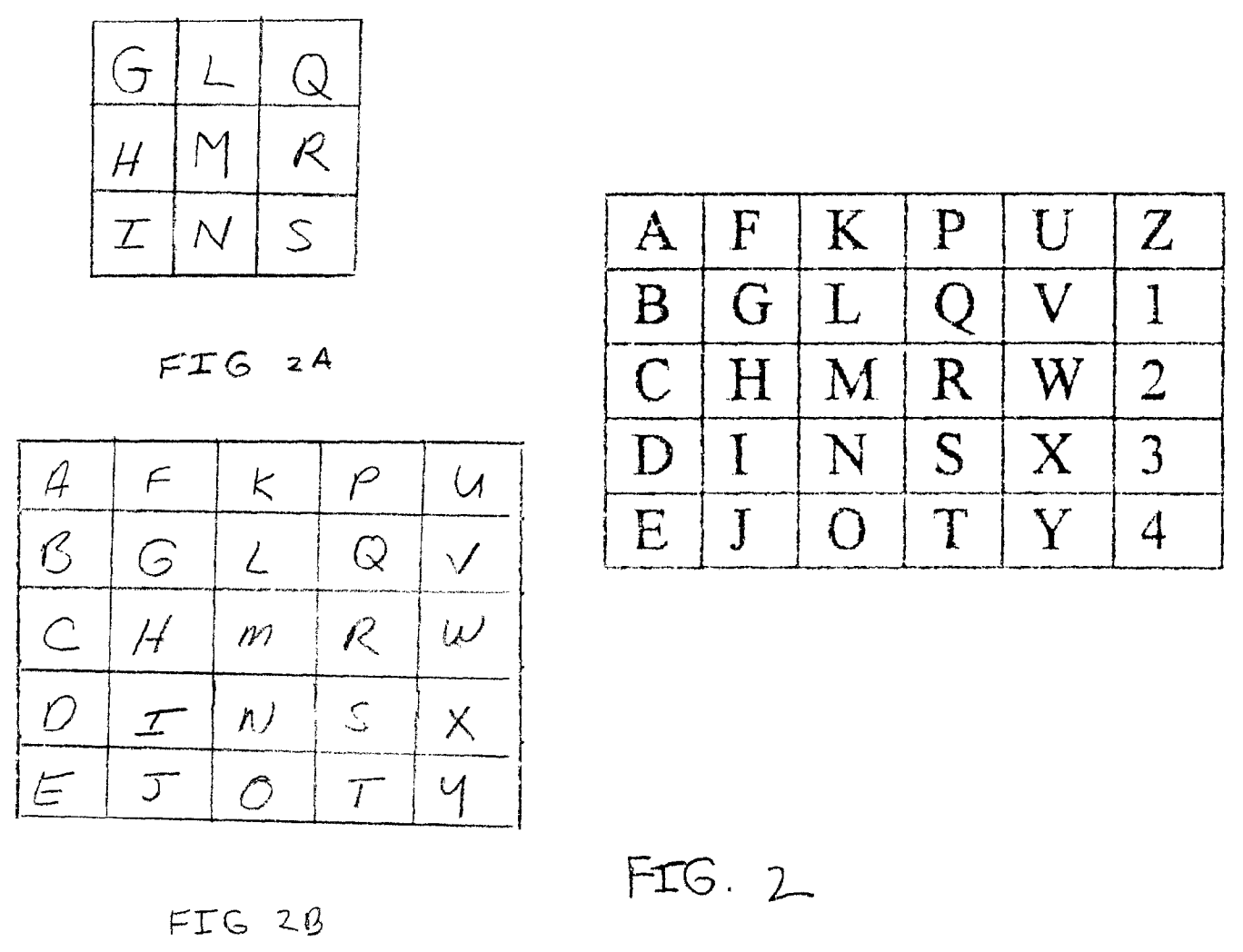

One exemplary way of accomplishing the above mentioned objectives is to use a filter (such as a digital filter) over an area of the scene that is received in the collected image data. In FIG. 2, a 5×6 kernel is shown containing information (A,B,C,D,E,F,G,H,I,J,K,L,M,N,O,P,Q,R,S,T,U,V,W,X,Y,Z,1,2,3,4). In FIG. 2A, a 3×3 kernel is shown containing (G,H,I,L,M,N,Q,R,S). In FIG. 2B, a 5×5 kernel is shown containing (A,B,C,D,E,F,G,H,I,J,K,L,M,N,O,P,Q,R,S,T,U,V,W,X,Y). These kernels containing information or data that is a representative breakdown into smaller subsets of an overall set of collected image data. Please note element "M" within each of the kernels shown in FIGS. 2, 2A, and 2B. Element "M" is known as the central pixel or the original pixel and it will be referred to as the central pixel or the original pixel.

The information contained in the kernel matrices can be retained in many forms without departing from the spirit and scope of the present invention. For example, in one embodiment, each matrix entry within the kernel can contain one pixel. One way of representing the pixel information is to use fixed point integers and place these values in each element of the matrix array that is the image kernel. Another way of representing the pixel information is to use a fourteen point two (14.2) nomenclature. In this particular exemplary nomenclature, fourteen (14) bits of integer data are used to represent an image and two (2) bits are used to represent subpixel values. The present invention will be discussed in light of the familiar gray scale pixel representation nomenclature.

However, it will also be apparent by those skilled in the art, that the present invention can be used to process color image data, such as that provided from a television camera. In the case of implementing color with the present invention, one way of representing the color pixel information is to place a triplet of red, blue and green (RGB) into each element of the matrix array. The method and the algorithm will also work with this type of information. In other words, the present invention is not limited to any one data type of image representation.

In one exemplary embodiment, a missile seeker (or other such targeting system) can be trained on a portion of the open sky while collecting image data. Different methods can be used to segment or refine the total amount of sky information collected and thought to contain a prospective target and thereby facilitate the convergence of the autofocusing algorithm onto a target. One way is to use a boresight to perform a rough alignment of the receiving optics and train the optics onto a prospective target. Once the optics has been trained in the general direction of the target, the algorithm takes over and wasted processing time is minimized. Another way of optimizing the image processing is to implement a scanning type of search where the sky is broken up into more manageable regions for processing, such as a center point field of view that is surrounded by four quadrants containing respective image information. When one of these regions is identified to contain a prospective target, the present invention concentrates on applying the autofocus algorithm on this portion of the sky thought to contain a target at a higher level of statistical confidence than the other regions.

In one exemplary embodiment, two different kernel filters are used to process received image data. A 3×3 kernel filter (FIG. 2A) and a 5×5 kernel filter (FIG. 2B) are used to determined the focus measure for an individual pixel. As mentioned previously, the central pixel or original pixel used in our example is "M".

The determination of the focus measure is then repeated for the neighbors (the neighboring pixels) of the individual pixel. For example, in this case of the 3×3 kernel filter shown in FIG. 2A, the neighboring pixels of the "M" central pixel are G,H,I,L,N,Q,R and S. This difference in focus measure from pixel to pixel is observed over some area (such as a 64×64 pixel region) to give a measure for that frame of data. In other words the 5×6 kernel (that yielded the 3×3 kernel and 5×5 kernel) was extracted from or is a subset of a 64×64 region. Please note that other sizes or regions of interest and filter kernels can be implemented by the present invention. FIG. 4 illustrates an exemplary set of variable that can be processed by the algorithm.

Multiple regions of interest (ROI) can be used to increase the robustness of the focus measure that was obtained for one frame of data. For example, as shown in FIG. 4, the present invention can start with fifteen (15) separate frames of image data to initiate the autofocus algorithm and examine what level of image quality and level number of image frames) can be thought of as a noise upper threshold. The number 5 (referring to a number of image frames) can be thought of as a noise lower threshold. In other words, the image processing rate can be adjusted down to a lower frame rate of 5 (from 15) if this lower level of 5 is sufficient to support the operation of the image processing system and conversely it can be adjusted upwards if system operation requires an adjustment in frame rate to support a given application.

In the exemplary set of variables enumerated in FIG. 4, the focus shift that we are looking for is a "small" one. One example of "small" is that the focus shift occurs at the least significant bit (LSB) level. The focus shift can be set to a desired level based upon a given application, types of image data expected, targeting optics used, desired resolution and other such variables and associated system parameters.

Once a desired level of focus is achieved, the algorithm can reduce the number of required reference frames of data to five (5) and still maintain focus. This allows an "on the fly" streamlining of the algorithm. Should the focus start to drift outside of the desired parameters, the amount of separate frames of image data can be increased back up to fifteen (15). Other permutations and combination of the amount of image frames are of course possible in other embodiments of the present invention.

The primary region of interest (ROI) that the autofocus algorithm focuses on and begins processing should come from either the center of the field of view or from the center of an object being tracked by the system is a track that is engaged. As mentioned earlier, this ROI determination can be done in any number of ways, such as boresighting or segmentation and scanning the sky background image data containing a prospective target.

Three different techniques and associated kernel sizes can be used to determine a better focus measure. The first technique used is a 1×2 kernel. The second technique that is used is a comparison of a blurred 3×3 region (FIG. 2A) with a center pixel (M). The difference of the blurred pixel from the original pixel "M" represents a high frequency contrast change in the image data.

This high frequency image is compared to its neighboring pixels and the focus measure can be determined from this result by summing the absolute difference of these neighbors. The blurred image has a three times (3×) improvement in noise performance while the central pixel (M) has none.

Figure 3:
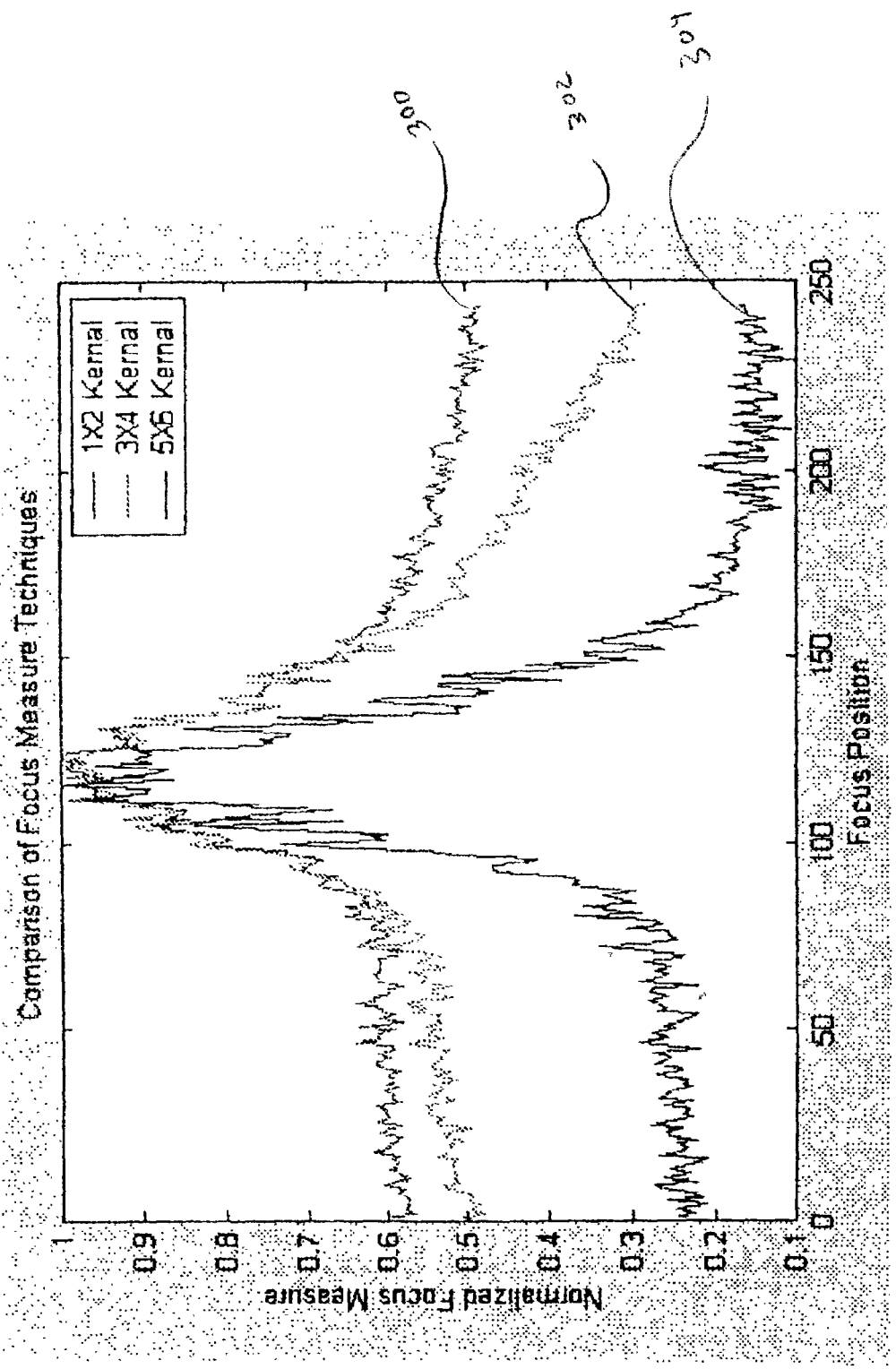
FIG. 3 is a graph showing the comparison of three different focus measurement techniques.

FIG. 3 is a comparative graph showing the relative focus measures that result from a 1×2 kernel (300), a 3×4 kernel (302) and a 5×6 kernel (304). FIG. 3 shows normalized focus measure as a function of focus position.

Note that in FIG. 3, the noise from the center pixel tends to raise the lower (out of focus) region of the curve and forces the measure to not give as sharp of a peak. The reason for this behavior is that the algorithm is measuring high frequency edge response and noise tends to be the highest frequency present in any image.

The third technique for achieving a focus measure uses a blurred 3×3 region compared to a blurred 5×5 region. This enables the monitoring of the change in the focus measure as a function of blur. This technique measure yields the best performance, because it compares the totally blurred response from a 5×5 blur kernel to that of a slightly blurred response with a 3×3 kernel.

Observation of the slightly blurred response will show a change in value as a function of focus. Observation of the 5×5 kernel will differ considerably less due to the larger blur area associated with a 5×5 size region. An additional benefit results with a 5×5 region, in that this 5×5 region results in a five times (5×) improvement in noise. This is in comparison with a 3×3 region that results in a three times (3×) improvement in noise.

The results of the autofocus algorithm of the present invention means that the lower limit of the algorithm (for a totally out of focus scene) has very little focus measure due to the fact that considerably less noise is being measured by the algorithm.

FIG. 2 will again be used to illustrate an example of blurring both a 3×3 region and a 5×5 region, subtracting the two regions, and generating an absolute difference measure from their neighbors. As shown in FIG. 2, the autofocus algorithm for determining a focus measure operates on a 5×6 size kernel that contains the image information. Again, the present invention can use other size kernel filters than the one described herein.

$$Fm = Abs(\text{sum}(-G-H-I+V+W+X)) - Abs(\text{sum}(-A-B-C-D-E+Z+1+2+3+4)))*(9/25)$$

The value of Fm should be calculated over a series of frames (15) without modifying focus. The value of the focus measure for that series of frames should then be made equal to the median value of the focus measures of all frames considered. This relationship is mathematically represented as:

$$FMi = \text{median}(Fm)$$

The criteria for a focus change would be that if the change in the focus measure from one series of data to the next is greater than five times (5×) the average deviation (STD) of the interim focus measures determined within that sequence. If this criterion is met, then the focus should be changed.

If the change in FM is too great, then the current FM is in question and the measure should not be used to compare against the next 15 frame sample median. To determine which way focus should change, the previous FM should be compared to the current one. If the current FM is greater than the previous one, then continue moving in the same direction as before, otherwise move the focus the other way.

If $Abs(FM_{i-1}FM_i) > STD(Fm)*15$ No Change

Elseif $Abs(FM_{i-1}-FM_i) < STD(FM)*5$ No Change

Elseif $(FM_{i-1}-FM_i) > STD(FM)*5$ Move focus backwards

Elseif $(FM_{i-1}-FM_i) < STD(Fm)*5$ Move focus forwards

The lower noise threshold will allow for only changing focus when needed and the upper threshold will prevent shifts due to singular anomalies going through the field of view (FOV).

Any small changes in focus caused by this algorithm should not be visible to the observer due to the fact that there will be small focus shifts which are very low. This small shift in focus will be visibly reduced by the use of a two dimensional (2-D) edge enhancement filter operating on the imagery. These 2-D edge enhancement filters are well known to those skilled in the art. The use of a sharpening filter will improve image quality substantially by reducing the middle and low frequency components of the image. Taking the local average of an image and subtracting a portion of it from the true image is how this is accomplished. Different kernel sizes are selected in order to perform edge enhancement at the proper frequency. The use of multiple kernels allows for a better approximation of the low frequency removal. A 2-D edge enhancement filter will reduce the low frequency content of the image and enhance the higher frequencies. This will reduce the observable effects of any slight shifts in focus.

The effects of the slight shift in focus would also be negligible. A small focus shift on the imagery going into many tracker algorithms will cause a minimal impact to tracker performance. Many edge based trackers blur the image with a 3×3 filter as an initial step and therefore they are not particularly sensitive to focus shifts.

Many correlation filters update their correlation maps with a recursive filter, which tends to have some blur in them as well.

A correlation tracker would very likely need to increase its update rate when a focus shift is determined to be needed. Therefore, the tracker should be notified of the fact that focus has been shifted and by how much.

Figure 5:
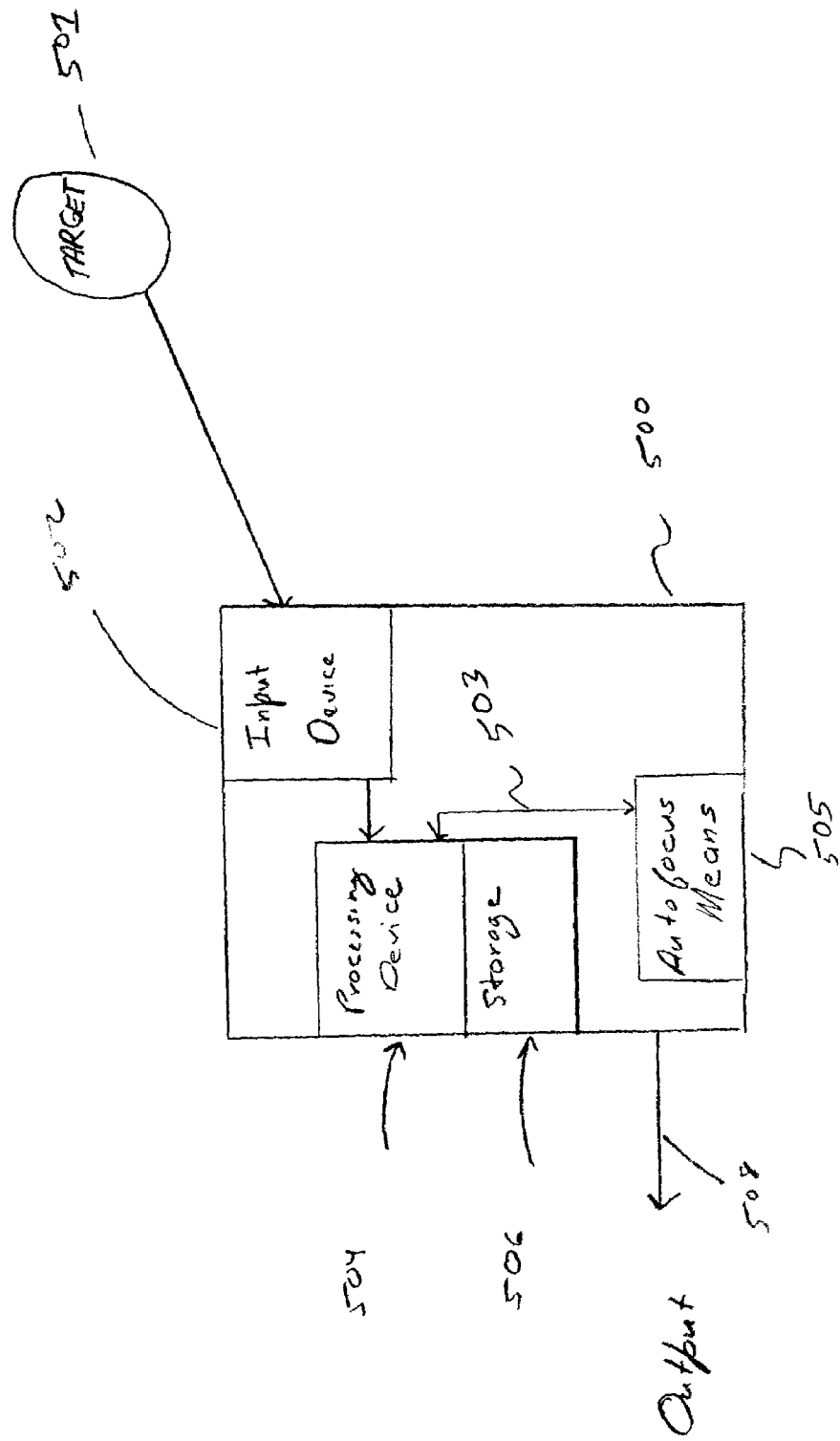
FIG. 5 is an illustration of an exemplary system of an exemplary embodiment of the present invention.

FIG. 5 discloses an exemplary embodiment of an autofocus system. In FIG. 5, a means for receiving image data (e.g., input device 502) receives image data from a target 501. This data is then forwarded to a processing device 504. In the processing device 504, there are means for monitoring and analyzing the contrast between different portions of the image data. This information is used in determining the location of a target, where the different portions of the image data contain at least one type of image pixel information and where the monitoring and analyzing is performed using at least one kernel filter to determine a focus measure.

In the processing device 504, the autofocus algorithm is executed. In FIG. 5, storage media 506 is used to store any data, calculation results, targeting information, intermediary values or any other information that is needed by the processing device 504 during its operation. Although not shown in FIG. 5, those skilled in the art will appreciate that the processing device 504 may also have some storage capability and storage media built into it (e.g., RAM on a motherboard) and conversely, the storage media 506 may have some processing capability resident in it. The figure is intended to illustrate one exemplary embodiment of a system that can implement the autofocus methods disclosed in this specification. The processing device 504 is connected to the autofocus means 505 by a communication line 503 (the communication line can be bi-directional or unidirectional).

The autofocus system 500 also contains autofocus means 505 that inlcudes devices that are used to adjust focus. The autofocus means controls any focus related devices or systems that are used to change the focus. For example, in one embodiment, the autofocus means 505 may control optics or optical systems, such as lenses, mirrors, microelectromechanical (MEMS) actuators, etc.

The autofocus system 500 observes an image quality of the image data that has been focused. An image is continuously output 508 to support an image processing frame rate and the focus is adjusted to obtain an improved focus image by adjusting the autofocus means 505 in a positive direction, a negative direction or a zero (0) direction based upon effectuating a desired change in the observed image quality of the image data.

In one embodiment, the target information 501 can be processed 504 by a digital computer having a central processor or with distributed or multiple processors. However, any suitable processor for implementing the methods disclosed herein may be used, including analog or optical processing.

What is claimed is:

1. An image based autofocus method comprising:

receiving image data and placing said data into a matrix representing a content of said image data to form a data matrix;

monitoring and analyzing the contrast between different portions of said image data matrix;

adjusting a focus mechanism that is focusing on said image data;

observing an image quality of said image data that has been focused; and continuously outputting an image to support an image processing frame rate and adjusting said focus mechanism to obtain an improved focus image by adjusting said focus mechanism in a positive direction, a negative direction or a zero (0) direction based upon effectuating a desired change in said observed image quality of said image data; and calculating a focus measure by the following equation:

$$Fm = \text{Abs}(\text{sum}(-G-H-I+V+W+X) - \text{Abs}(\text{sum}(-A-B-C-D-E+Z+1+2+3+4))*(9/25)$$

where:
Fm is a focus measure about a central pixel M; and
Values A–Z and 1–4 represent pixel information.

2. The image based autofocus method of claim 1, wherein said monitoring and analyzing comprises:
applying a first filter to a region of said two dimensional data matrix;
applying a second filter different from the first filter to a region of said two dimensional data matrix;
adjusting the focusing mechanism by using the filtered data from both first and second filters to calculate a focus measure.

3. An image based autofocus method of claim 2 wherein the first filter uses a 3×3 kernel of pixels and the second filter uses a 5×5 kernel of pixels.

4. The method of claim 3 further comprising:
repeating the determination of focus measure calculation for the neighboring pixels of an individual pixel.

5. The method of claim 3 further comprising:
calculating a difference in focus measure from pixel to pixel in an observation area to determine a focus measure for that frame of data.

6. The method of claim 5 wherein said observation area comprises a 64×64 pixel region.

7. The method of claim 3 further comprising:
increasing the robustness of said focus measure obtained from a frame of data by using multiple regions of interest (ROI).

8. The method of claim 7 further comprising:
selecting said ROI from a center location of a field of view.

9. The method of claim 7 further comprising:
selecting said ROI from a center location of an object being tracked.

10. The method of claim 3 further comprising:
using a combination of at least three different techniques to determine a better focus measure.

11. The method of claim 3 further comprising:
a technique of using a 1×2 pixel region to determine a focus measure.

12. The method of claim 3 further comprising:
a technique of comparing a blurred 3×3 region with a central pixel wherein the difference of the blurred pixel from said central pixel represents a high frequency contrast change in an image and said image is a high frequency image.

13. The method of claim 12 further comprising:
comparing said high frequency image to its neighboring pixels and said focus measure can be determined from the comparison result by summing the absolute difference of said neighboring pixels.

14. The method of claim 12 further comprising:
said blurred image has a three times (3×) improvement in noise performance while said central pixel has none.

* * * * *